Dec. 9, 1930.  S. A. STRANAHAN  1,784,766
RADIATOR MOUNTING
Filed June 23, 1928  2 Sheets-Sheet 1
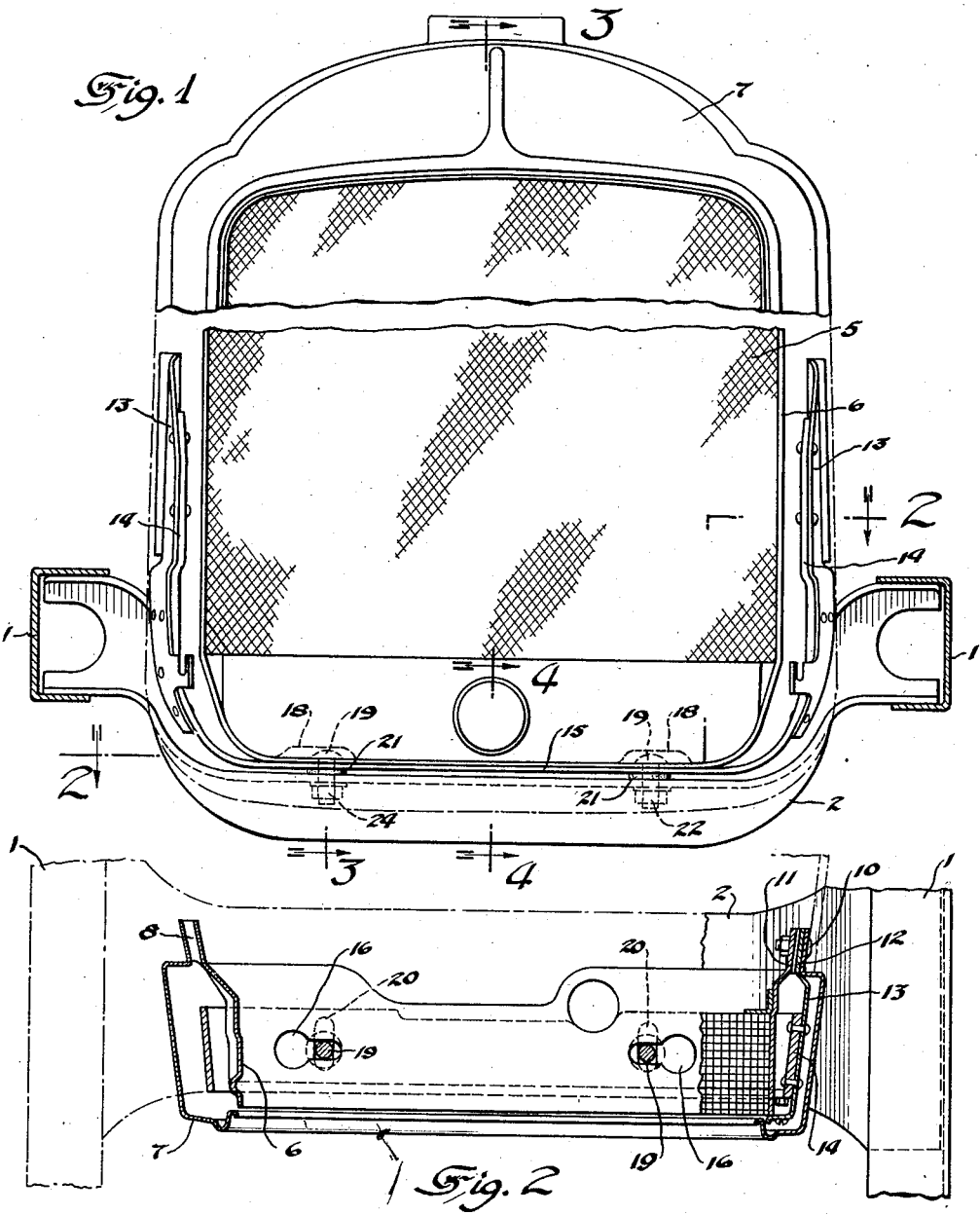
Inventor
Samuel A. Stranahan Dec. 9, 1930.   S. A. STRANAHAN   1,784,766
RADIATOR MOUNTING
Filed June 23, 1928   2 Sheets-Sheet 2

Inventor
Samuel A. Stranahan
By Blackmore, Spencer & Flick
Attorneys

Patented Dec. 9, 1930

1,784,766

UNITED STATES PATENT OFFICE

SAMUEL A. STRANAHAN, OF FLINT, MICHIGAN, ASSIGNOR TO GENERAL MOTORS CORPORATION, OF DETROIT, MICHIGAN, A CORPORATION OF DELAWARE

RADIATOR MOUNTING

Application filed June 23, 1928. Serial No. 287,836.

This invention relates to motor vehicles and more particularly to an improved type of mounting for the radiator forming a part of the engine cooling system.

It is among the objects of the invention to provide a mounting of extreme simplicity for the purpose of economy of manufacture, and by which assembly of the radiator on a vehicle may be easily and quickly accomplished.

It is a further object of the invention to provide a mounting which will permit both longitudinal and transverse shifting movement of the radiator to bring it into proper relation with its associated parts, and which will thereafter securely hold it in adjusted position against displacement.

Other incidental objects will be apparent from the following specification taken in connection with the accompanying drawings wherein Fig. 1 is a fragmentary elevation of a radiator mounted upon a vehicle chassis in accordance with the present invention, parts thereof being broken away.

Figure 4:
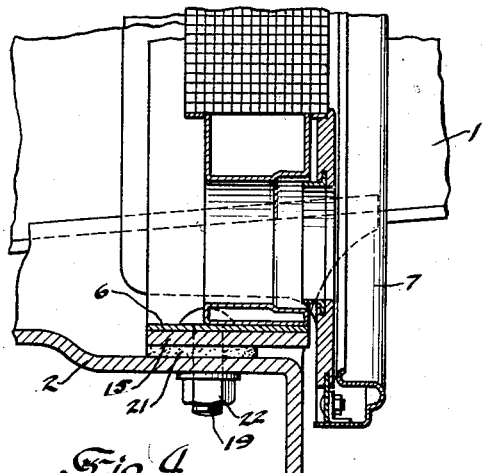
Figure 3:
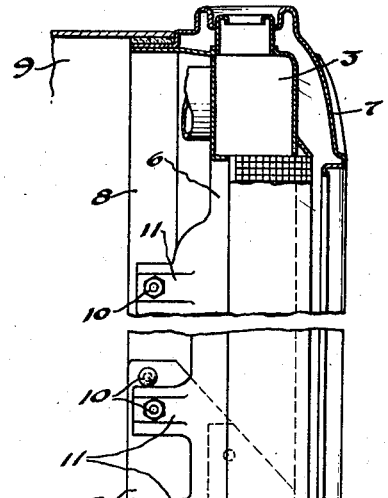
Figure 5:
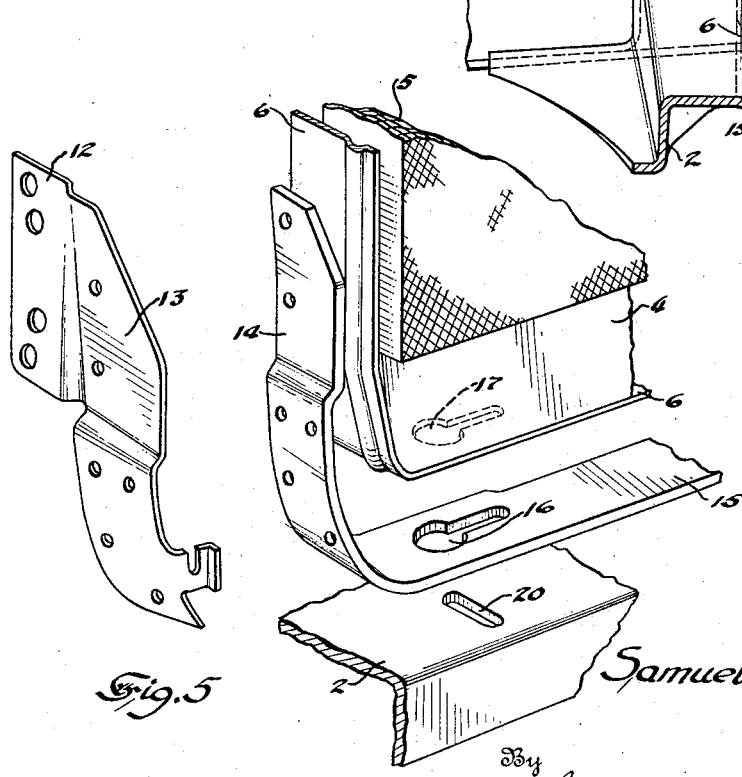

Fig. 2 is a section on the line 2—2 of Fig. 1.
Fig. 3 is a section on the line 3—3 of Fig. 1.
Fig. 4 is a section on the line 4—4 of Fig. 1 and Fig. 5 is a detail perspective view of certain of the mounting parts detached one from another.

Referring more particularly to the drawing which shows a preferred embodiment of the invention, the numerals 1—1 indicate a pair of longitudinally extending side bars of the vehicle chassis frame, connected adjacent their forward ends by a cross bar 2. The structure of the radiator includes an upper tank or inlet header 3, a lower tank or outlet header 4 and an intermediate core assembly 5 for the passage of water, the tanks and core assembly being encircled by a hoop or band 6. Surrounding the radiator unit is an ornamental shell or casing 7 having a rearwardly projecting flange or ledge 8 upon which the engine hood or bonnet 9 rests. Fastening bolts 10 secure the hood ledge 8 to rearwardly projecting ears or extensions 11 of the hoop 6, and to an extension or ear 12 of a plate 13. Two of such plates are provided, one at each side of the shell, the plates being secured by rivets, welding or otherwise to upwardly extending arms 14 of a U-shaped mounting bar or strap 15. The mounting bar and also the strap or hoop 6 are each provided with a pair of keyhole slots 16 and 17 respectively, that extend transversely of the vehicle, and the bottom wall of the lower tank directly over the slots is depressed upwardly as at 18, to provide a space or clearance for the head of a bolt 19 extending through the slots 17 and 16 and also through a longitudinally extending elongated slot 20 in the transverse frame member. Interposed between the frame member 2 and bar 15 and held in position by the bolt or stud 19, is a shim or washer 21 of friction material, which serves to prevent displacement of the radiator when the nut 22 on the stud is drawn up.

In mounting the radiator on the frame the heads of the bolts are first inserted through the enlarged portions of the keyhole slots 16 and 17 of the mounting bar 15 and hoop 6 respectively, and the bolts shifted sidewise into the smaller portions of the slots. The radiator assembly is then placed over the frame member with the bolt shanks extending through the slots 20 and carrying the friction shims 21 between the bar 15 and frame member 2. At this point the radiator may be shifted either transversely or back and forth by reason of the angularly disposed slots, so as to bring its inlet and outlet connections into proper relation with the engine and also to properly line up the radiator with the cowl, in order that a neat fit of the engine hood or bonnet may be effected. After the parts are brought into proper relation, the nuts 22 are drawn up and the radiator is firmly held against displacement. The angular arrangement of the slots readily permits re-adjustment of the radiator position at any time during use.

While the preferred embodiment has been described more or less specifically, it is to be understood that the invention is not limited to the exact details shown, but that such modifications may be made as come within the scope of the appended claims.

I claim:

1. In a motor vehicle, an adjustable mounting for rigidly securing a radiator on a chassis frame, in proper relation with its associated parts, including in combination with a chassis frame member having an elongated slot and a radiator including a shell and a radiating unit having an assembly retainer strap extending in part across the underside of the bottom tank of the unit, of a supporting bar interposed between said retainer strap and the chassis frame member and secured to the shell, said bar and strap having therein registering keyhole slots extending angularly in relation with the elongated slot of the frame member, a depression in the bottom wall of the lower tank directly over and extending thruout the length of the keyhole slots to provide clearance space thereabove, a headed fastening stud, whose head is adapted for insertion upwardly thru the enlarged portions of the keyhole slots into said clearance space, and whose shank is slidable in the angularly disposed slots to permit adjustment of radiator position, and a nut threaded on the lower end of the shank to clamp the parts in adjusted position.

2. In addition to the elements of claim 1, a friction liner interposed between the frame member and supporting bar to frictionally resist movement of the parts from their adjusted position.

In testimony whereof I affix my signature.

SAMUEL A. STRANAHAN.